United States Patent
Tiirola et al.

(10) Patent No.: US 11,540,152 B2
(45) Date of Patent: Dec. 27, 2022

(54) WIDEBAND PDCCH FOR UNLICENSED BAND USEFUL FOR NEW RADIO

(71) Applicant: NOKIA TECHNOLOGIES OY, Espoo (FI)

(72) Inventors: Esa Tapani Tiirola, Kempele (FI); Kari Juhani Hooli, Oulu (FI); Timo Erkki Lunttila, Espoo (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 262 days.

(21) Appl. No.: 17/041,575

(22) PCT Filed: Apr. 6, 2018

(86) PCT No.: PCT/FI2018/050249
§ 371 (c)(1),
(2) Date: Sep. 25, 2020

(87) PCT Pub. No.: WO2019/193238
PCT Pub. Date: Oct. 10, 2019

(65) Prior Publication Data
US 2021/0092622 A1 Mar. 25, 2021

(51) Int. Cl.
*H04L 12/28* (2006.01)
*H04W 24/08* (2009.01)
(Continued)

(52) U.S. Cl.
CPC ........... *H04W 24/08* (2013.01); *H04L 1/0038* (2013.01); *H04W 16/14* (2013.01); *H04W 72/042* (2013.01); *H04W 72/0453* (2013.01)

(58) Field of Classification Search
CPC .... H04L 5/0053; H04W 16/14; H04W 72/04; H04W 72/0453
(Continued)

(56) References Cited

U.S. PATENT DOCUMENTS

2014/0036853 A1 2/2014 Kim et al.
2015/0245350 A1 8/2015 Webb et al.
(Continued)

FOREIGN PATENT DOCUMENTS

WO WO 2017/034238 A1 3/2017
WO WO 2018/031327 A1 2/2018

OTHER PUBLICATIONS

Extended European Search Report dated Oct. 19, 2021 corresponding to European Patent Application No. 18913644.3.
(Continued)

*Primary Examiner* — John Pezzlo
(74) *Attorney, Agent, or Firm* — Squire Patton Boggs (US) LLP

(57) ABSTRACT

A UE performs first control channel monitoring according to a first CORESET and first search space set configuration(s), the first control channel monitoring performed on n subbands, n>1, able to be transmitted by a base station in an unlicensed band carrier. The UE determines, in response to a detection of a control channel in the monitoring and from the control channel, transmission bandwidth configuration to be used by the base station in the unlicensed band carrier for control channels. The UE performs second control channel monitoring according to a second CORESET and at least one second search space set configuration. The second control channel monitoring is performed on m subbands, m≤n, in the unlicensed band carrier, the m subbands being a subset of the n of subbands. A base station determines which subbands are available for use and transmits the transmission bandwidth configuration to the UE based thereon.

20 Claims, 12 Drawing Sheets

(51) Int. Cl.
  *H04L 1/00*     (2006.01)
  *H04W 16/14*    (2009.01)
  *H04W 72/04*    (2009.01)
  *H04J 1/16*     (2006.01)

(58) Field of Classification Search
  USPC ....................................... 370/252, 329, 430
  See application file for complete search history.

(56) References Cited

U.S. PATENT DOCUMENTS

| | | | |
|---|---|---|---|
| 2018/0054342 A1 | 2/2018 | Nory et al. | |
| 2018/0227777 A1* | 8/2018 | Sun ..................... | H04W 72/042 |
| 2019/0306832 A1* | 10/2019 | Si ..................... | H04W 56/0015 |
| 2020/0177254 A1* | 6/2020 | Lee ..................... | H04B 7/0632 |
| 2020/0221428 A1* | 7/2020 | Moon .................. | H04B 7/024 |

OTHER PUBLICATIONS

International Search Report and Written Opinion dated Aug. 10, 2018 corresponding to International Patent Application No. PCT/FI2018/050249.

J. Jeon, "NR Wide Bandwidth Operations." In: IEEE Communications Magazine IEEE, Mar. 2018, vol. 56, No. 3, pp. 42-46.

\* cited by examiner

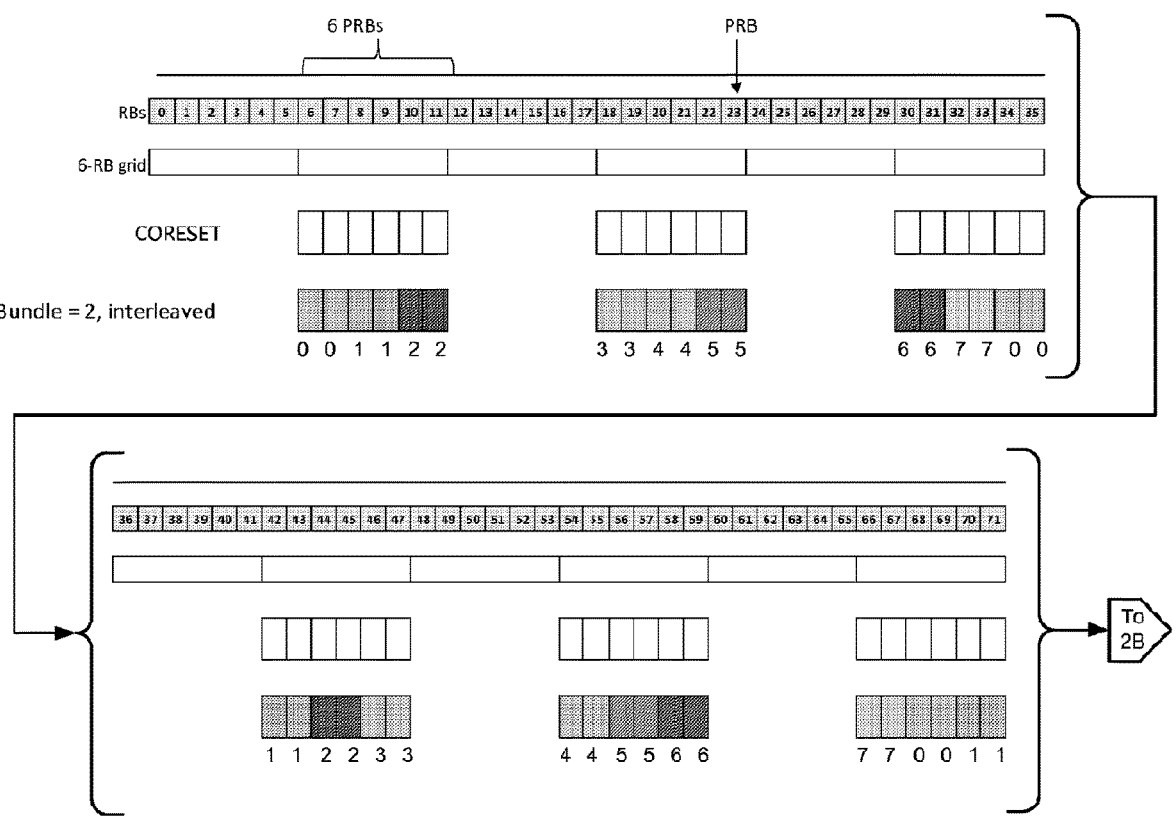
FIG. 2: FIG. 2A

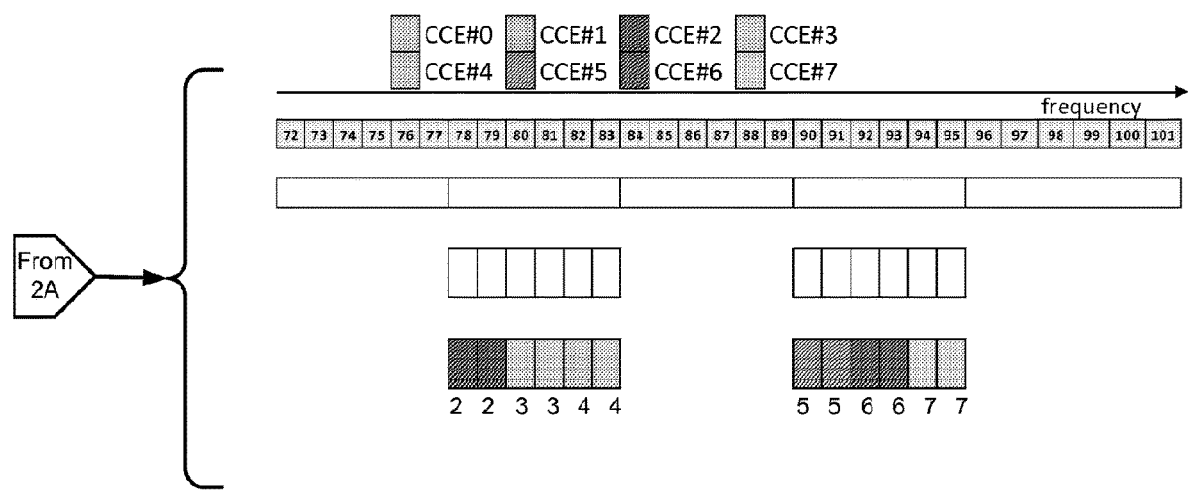
FIG. 2: FIG. 2B

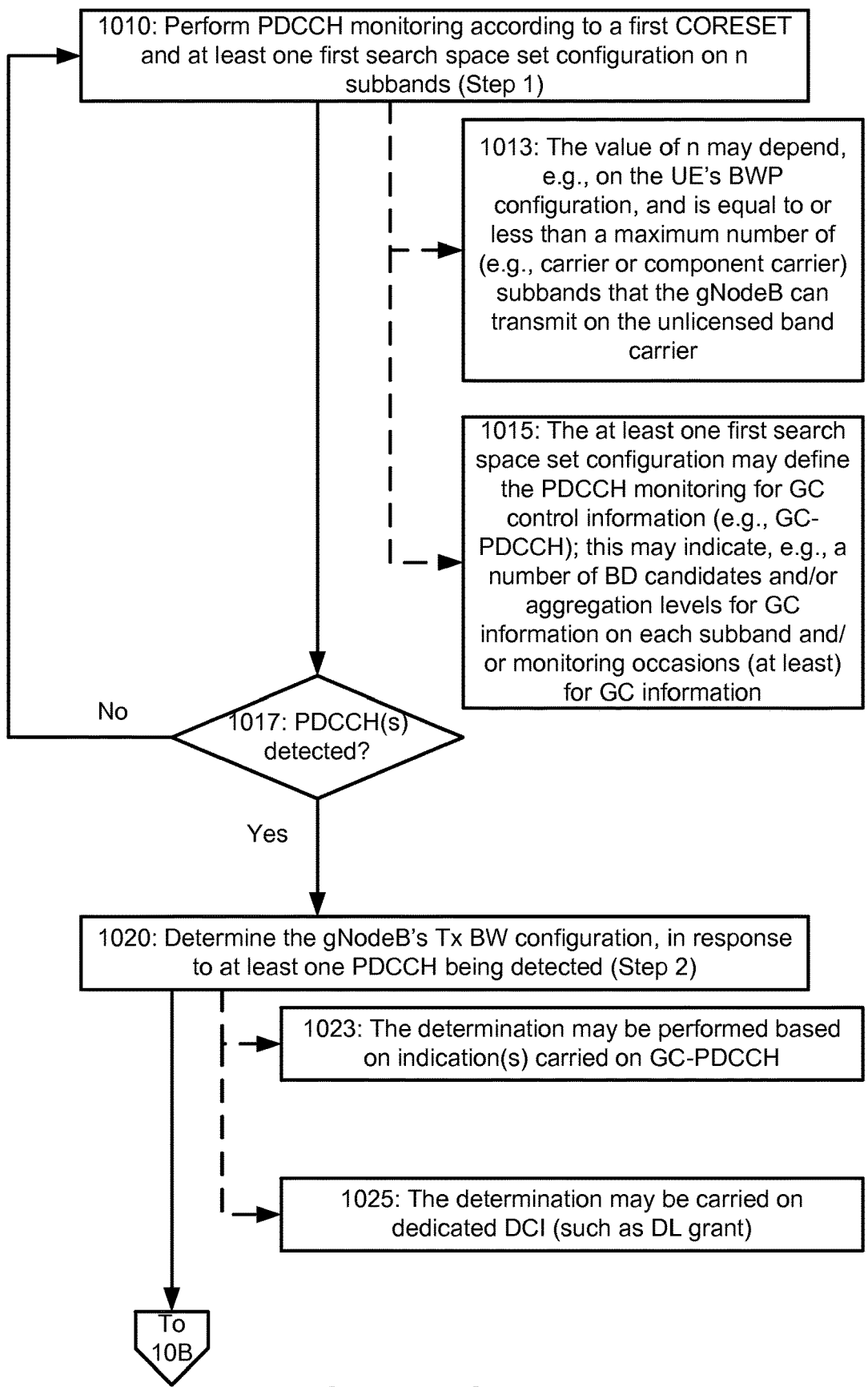
FIG. 10: FIG. 10A

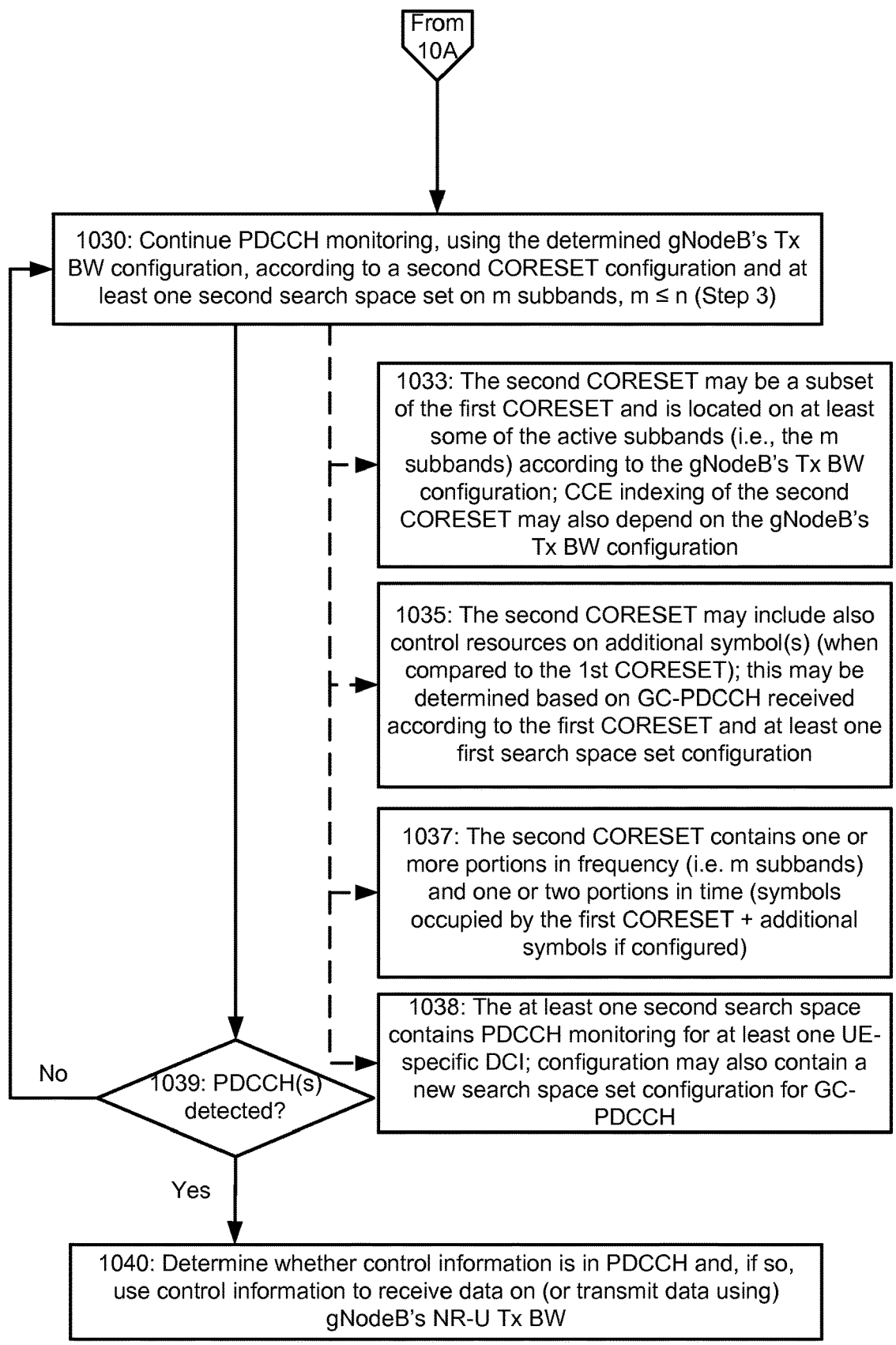
FIG. 10: FIG. 10B

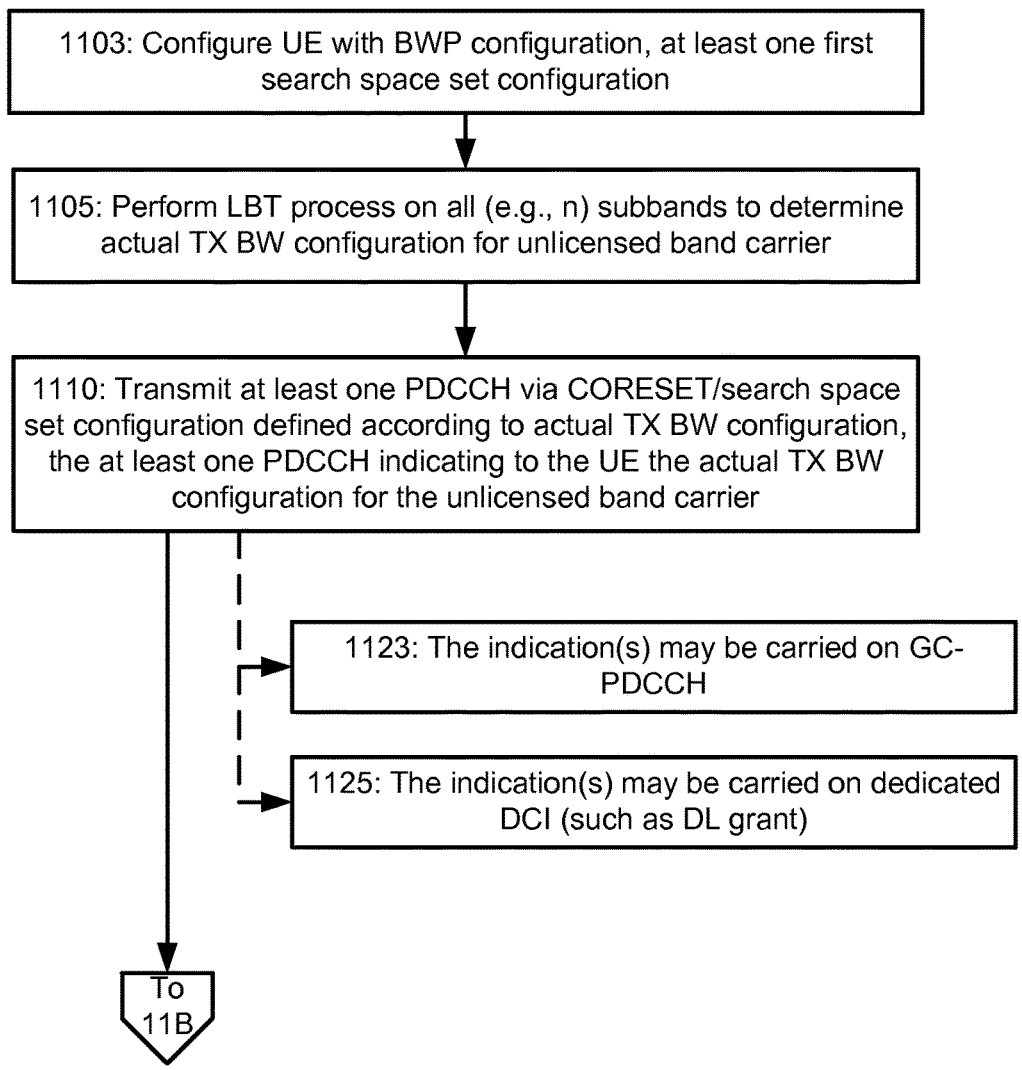
FIG. 11: FIG. 11A

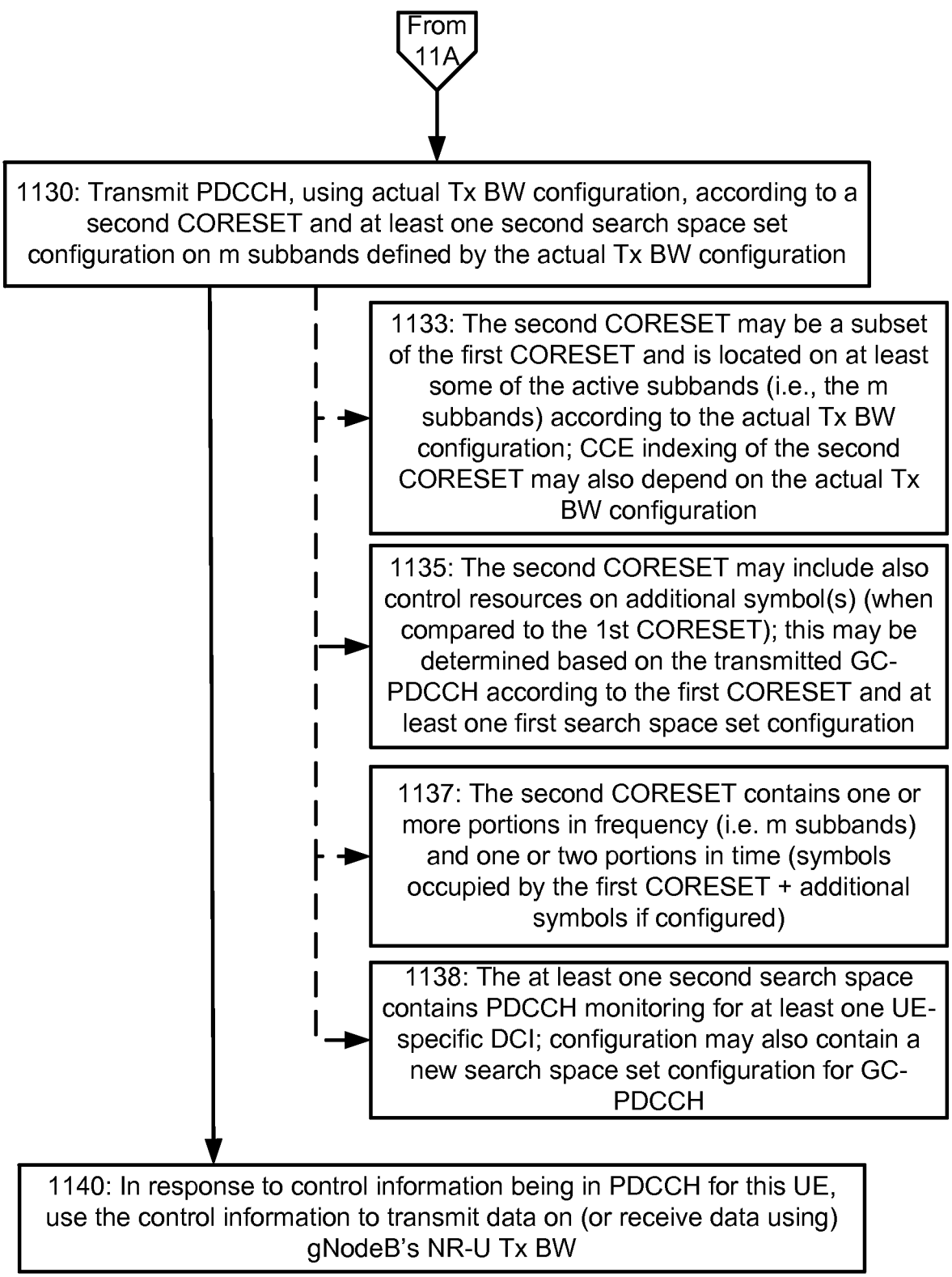
FIG. 11: FIG. 11B

WIDEBAND PDCCH FOR UNLICENSED BAND USEFUL FOR NEW RADIO

RELATED APPLICATION

This application was originally filed as PCT Application No. PCT/FI2018/050249 on Apr. 6, 2018.

TECHNICAL FIELD

This invention relates generally to wireless communications and, more specifically, relates to downlink control channels and unlicensed band usage.

BACKGROUND

This section is intended to provide a background or context to the invention disclosed below. The description herein may include concepts that could be pursued, but are not necessarily ones that have been previously conceived, implemented or described. Therefore, unless otherwise explicitly indicated herein, what is described in this section is not prior art to the description in this application and is not admitted to be prior art by inclusion in this section. Abbreviations that may be found in the specification and/or the drawing figures are defined below, after the main part of the detailed description section.

There are several unlicensed bands having wide frequency bands. Even a single gNB or a UE can access very wide bandwidths using these. Hence, wideband operation is one of the building blocks for NR unlicensed band operation. In fact, 3GPP has approved a new study item (SI) related to NR-based access to unlicensed spectrum. See Qualcomm, "New SID on NR-based Access to Unlicensed Spectrum", 3GPP TSG RAN Meeting #75, RP-170828, Dubrovnik, Croatia, Mar. 6-9, 2017.

For such NR unlicensed (NR-U) band scenarios, there should be some way for the network (e.g., gNB) to get control information to the UE concerning the NR-U band. One way is using a downlink control channel, and specifically PDCCH transmissions and monitoring in the case when NR-U operates according to wideband operation.

BRIEF SUMMARY

This section is intended to include examples and is not intended to be limiting.

In an exemplary embodiment, a method is disclosed that includes: performing at a user equipment first control channel monitoring according to a first control resource set and at least one first search space set configuration, the first control channel monitoring performed on n subbands, n>1, able to be transmitted by a base station in an unlicensed band carrier; determining, in response to a detection of a control channel in the monitoring and from the control channel, transmission bandwidth configuration to be used by the base station in the unlicensed band carrier for control channels; and performing by the user equipment second control channel monitoring according to a second control resource set and at least one second search space set configuration, the second control channel monitoring performed on m subbands, m≤n, in the unlicensed band carrier, the m subbands being a subset of the n of subbands.

An additional exemplary embodiment includes a computer program, comprising code for performing the method of the previous paragraph, when the computer program is run on a processor. The computer program according to this paragraph, wherein the computer program is a computer program product comprising a computer-readable medium bearing computer program code embodied therein for use with a computer.

An exemplary apparatus includes one or more processors and one or more memories including computer program code. The one or more memories and the computer program code are configured to, with the one or more processors, cause the apparatus to perform at least the following: performing at a user equipment first control channel monitoring according to a first control resource set and at least one first search space set configuration, the first control channel monitoring performed on n subbands, n>1, able to be transmitted by a base station in an unlicensed band carrier; determining, in response to a detection of a control channel in the monitoring and from the control channel, transmission bandwidth configuration to be used by the base station in the unlicensed band carrier for control channels; and performing by the user equipment second control channel monitoring according to a second control resource set and at least one second search space set configuration, the second control channel monitoring performed on m subbands, m≤n, in the unlicensed band carrier, the m subbands being a subset of the n of subbands.

An exemplary computer program product includes a computer-readable storage medium bearing computer program code embodied therein for use with a computer. The computer program code includes: code for performing at a user equipment first control channel monitoring according to a first control resource set and at least one first search space set configuration, the first control channel monitoring performed on n subbands, n>1, able to be transmitted by a base station in an unlicensed band carrier; code for determining, in response to a detection of a control channel in the monitoring and from the control channel, transmission bandwidth configuration to be used by the base station in the unlicensed band carrier for control channels; and code for performing by the user equipment second control channel monitoring according to a second control resource set and at least one second search space set configuration, the second control channel monitoring performed on m subbands, m≤n, in the unlicensed band carrier, the m subbands being a subset of the n of subbands.

In another exemplary embodiment, an apparatus comprises means for performing: performing at a user equipment first control channel monitoring according to a first control resource set and at least one first search space set configuration, the first control channel monitoring performed on n subbands, n>1, able to be transmitted by a base station in an unlicensed band carrier; determining, in response to a detection of a control channel in the monitoring and from the control channel, transmission bandwidth configuration to be used by the base station in the unlicensed band carrier for control channels; and performing by the user equipment second control channel monitoring according to a second control resource set and at least one second search space set configuration, the second control channel monitoring performed on m subbands, m≤n, in the unlicensed band carrier, the m subbands being a subset of the n of subbands.

In an exemplary embodiment, a method is disclosed that includes: transmitting by a base station and toward a user equipment at least one control channel and via a first control resource set and search space set configuration defined according to an actual transmission bandwidth configuration for an unlicensed band carrier for the base station, the at least one control channel indicating to the user equipment the actual transmission bandwidth configuration for the unlicensed band carrier; and transmitting a control channel using the actual transmission bandwidth configuration for the unlicensed band carrier, according to a second control resource set and at least one second search space set on one or more subbands defined by the actual transmission bandwidth configuration.

An additional exemplary embodiment includes a computer program, comprising code for performing the method of the previous paragraph, when the computer program is run on a processor. The computer program according to this paragraph, wherein the computer program is a computer program product comprising a computer-readable medium bearing computer program code embodied therein for use with a computer.

An exemplary apparatus includes one or more processors and one or more memories including computer program code. The one or more memories and the computer program code are configured to, with the one or more processors, cause the apparatus to perform at least the following: transmitting by a base station and toward a user equipment at least one control channel and via a first control resource set and search space set configuration defined according to an actual transmission bandwidth configuration for an unlicensed band carrier for the base station, the at least one control channel indicating to the user equipment the actual transmission bandwidth configuration for the unlicensed band carrier; and transmitting a control channel using the actual transmission bandwidth configuration for the unlicensed band carrier, according to a second control resource set and at least one second search space set on one or more subbands defined by the actual transmission bandwidth configuration.

An exemplary computer program product includes a computer-readable storage medium bearing computer program code embodied therein for use with a computer. The computer program code includes: code for transmitting by a base station and toward a user equipment at least one control channel and via a first control resource set and search space set configuration defined according to an actual transmission bandwidth configuration for an unlicensed band carrier for the base station, the at least one control channel indicating to the user equipment the actual transmission bandwidth configuration for the unlicensed band carrier; and code for transmitting a control channel using the actual transmission bandwidth configuration for the unlicensed band carrier, according to a second control resource set and at least one second search space set on one or more subbands defined by the actual transmission bandwidth configuration.

In another exemplary embodiment, an apparatus comprises means for performing: transmitting by a base station and toward a user equipment at least one control channel and via a first control resource set and search space set configuration defined according to an actual transmission bandwidth configuration for an unlicensed band carrier for the base station, the at least one control channel indicating to the user equipment the actual transmission bandwidth configuration for the unlicensed band carrier; and transmitting a control channel using the actual transmission bandwidth configuration for the unlicensed band carrier, according to a second control resource set and at least one second search space set on one or more subbands defined by the actual transmission bandwidth configuration.

BRIEF DESCRIPTION OF THE DRAWINGS

In the attached Drawing Figures:

FIG. 2, split over FIGS. 2A and 2B, is an example of interleaved REG-to-CCE mapping, with REG bundle size=2, and with a 3-row interleaver;

FIG. 10, split over FIGS. 10A and 10B, is a logic flow diagram performed by a UE for wideband PDCCH for the unlicensed band and suitable for new radio, and illustrates the operation of an exemplary method or methods, a result of execution of computer program instructions embodied on a computer readable memory, functions performed by logic implemented in hardware, and/or interconnected means for performing functions in accordance with exemplary embodiments; and FIG. 11, split over FIGS. 11A and 11B, is a logic flow diagram performed by a gNB for wideband PDCCH for the unlicensed band and suitable for new radio, and illustrates the operation of an exemplary method or methods, a result of execution of computer program instructions embodied on a computer readable memory, functions performed by logic implemented in hardware, and/or interconnected means for performing functions in accordance with exemplary embodiments.

DETAILED DESCRIPTION OF THE DRAWINGS

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

The exemplary embodiments herein describe techniques for wideband PDCCH for the unlicensed band and suitable for new radio. Additional description of these techniques is presented after a system into which the exemplary embodiments may be used is described.

Figure 1:
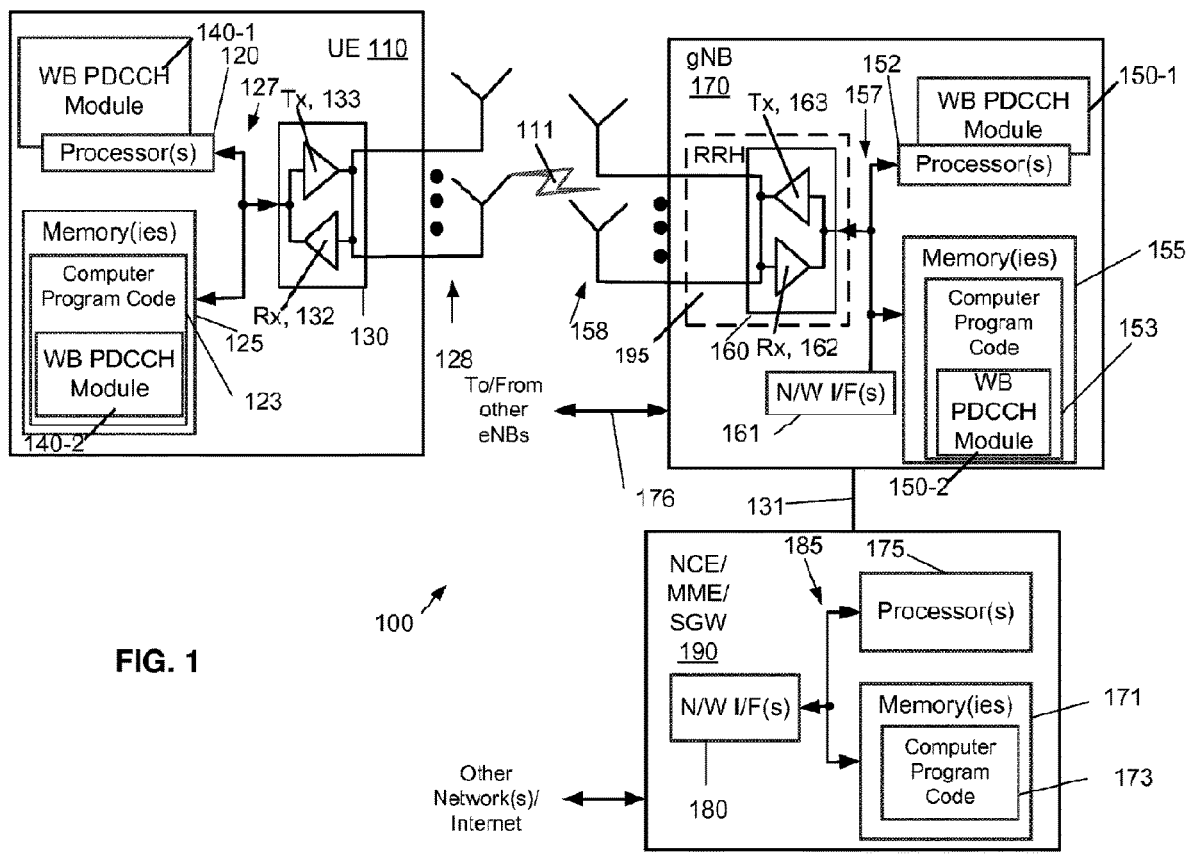
FIG. 1 is a block diagram of one possible and non-limiting exemplary system in which the exemplary embodiments may be practiced.

Turning to FIG. 1, this figure shows a block diagram of one possible and non-limiting exemplary system in which the exemplary embodiments may be practiced. In FIG. 1, a user equipment (UE) 110 is in wireless communication with a wireless network 100. A UE is a wireless, typically mobile device that can access a wireless network. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 includes a wideband (WB) physical downlink control channel (PDCCH) module 140, comprising one of or both parts 140-1 and/or 140-2, which may be implemented in a number of ways. The WB PDCCH module 140 may be implemented in hardware as WB PDCCH module 140-1, such as being implemented as part of the one or more processors 120. The WB PDCCH module 140-1 may be implemented also as an integrated circuit or through other hardware such as a programmable gate array. In another example, the WB PDCCH module 140 may be implemented as WB PDCCH module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with gNB 170 via a wireless link 111.

The gNB 170 is a base station (e.g., for NR/5G) that provides access by wireless devices such as the UE 110 to the wireless network 100. Although primary reference herein is to a gNB, it might also be possible for disclosed techniques to be performed by an eNB, which is a base station for LTE. The gNB 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The gNB 170 includes a WB PDCCH module 150, comprising one of or both parts 150-1 and/or 150-2, which may be implemented in a number of ways. The WB PDCCH module 150 may be implemented in hardware as WB PDCCH module 150-1, such as being implemented as part of the one or more processors 152. The WB PDCCH module 150-1 may be implemented also as an integrated circuit or through other hardware such as a programmable gate array. In another example, the WB PDCCH module 150 may be implemented as WB PDCCH module 150-2, which is implemented as computer program code 153 and is executed by the one or more processors 152. For instance, the one or more memories 155 and the computer program code 153 are configured to, with the one or more processors 152, cause the gNB 170 to perform one or more of the operations as described herein. The one or more network interfaces 161 communicate over a network such as via the links 176 and 131. Two or more gNBs 170 communicate using, e.g., link 176. The link 176 may be wired or wireless or both and may implement, e.g., an X2 interface.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195, with the other elements of the gNB 170 being physically in a different location from the RRH, and the one or more buses 157 could be implemented in part as fiber optic cable to connect the other elements of the gNB 170 to the RRH 195.

It is noted that description herein indicates that "cells" perform functions, but it should be clear that the gNB that forms the cell will perform the functions. The cell makes up part of a gNB. That is, there can be multiple cells per gNB. For instance, there could be three cells for a single gNB carrier frequency and associated bandwidth, each cell covering one-third of a 360 degree area so that the single gNB's coverage area covers an approximate oval or circle. Furthermore, each cell can correspond to a single carrier and a gNB may use multiple carriers. So if there are three 120 degree cells per carrier and two carriers, then the gNB has a total of 6 cells.

The wireless network 100 may include a network control element (NCE) 190 that may include MME (Mobility Management Entity)/SGW (Serving Gateway) functionality, and which provides connectivity with a further network, such as a telephone network and/or a data communications network (e.g., the Internet). The gNB 170 is coupled via a link 131 to the NCE 190. The link 131 may be implemented as, e.g., an S1 interface. The NCE 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the NCE 190 to perform one or more operations.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

In general, the various embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, gNB 170, and other functions as described herein.

Having thus introduced one suitable but non-limiting technical context for the practice of the exemplary embodiments of this invention, the exemplary embodiments will now be described with greater specificity.

As described above, 3GPP has approved a new study item related to NR-based access to unlicensed spectrum. This document concerns monitoring of the downlink control channel in NR unlicensed (NR-U) band scenarios. More specifically, we consider PDCCH monitoring in the case when NR-U operates according to wideband operation.

The rest of this disclosure is divided into sections for ease of reference.

I. Overview of NR PDCCH

NR physical downlink control channel (PDCCH) may be used to convey downlink control information (DCI). It may utilize OFDM waveform(s) and polar coding. NR PDCCH may utilize every fourth resource element for demodulation reference signals (DMRSs). DCI can be used for downlink (DL) and uplink (UL) resource allocation signaling. DCI may be used also for other purposes, such as carrier aggregation and bandwidth part (BWP) (de)activation, frame structure indication (with group common PDCCH, GC-PDCCH) and power control updates. GC-PDCCH may be used for slot format indication (SFI) in NR.

Certain embodiments herein are directed to the monitoring of the control channel in NR that may be carried out by means of blind searches. Blind searching, also called blind decoding, refers to the process by which a UE 110 finds its PDCCH by monitoring a set of PDCCH candidates in every monitoring occasion. A monitoring occasion can be once a slot, once per multiple slots, or multiple times in a slot. In an embodiment, physical downlink control channel (PDCCH) blind search may be arranged by means of parallel search space sets mapped to one or multiple control resource sets (CORESETs). During a PDCCH blind search, a UE 110 may be monitoring predefined control channel elements (CCEs), aggregated CCEs and/or downlink control information (DCI) sizes with predefined RNTIs (Radio Network Temporary Identifier) in predefined time instants, corresponding to configured monitoring occasions.

CCEs may be arranged within a predefined CORESET configured via higher layer signaling. Each CCE may include 6 REGs, each REG consisting of 12 subcarriers within 1 OFDM symbol, and 1, 2 or 3 REG bundles. REG bundles may be arranged into the CORESET either according to interleaved or non-interleaved mapping. The UE 110 may assume that REG bundle defines the precoder granularity in frequency and time used by the gNB 170 when transmitting PDCCH. CORESET resources may be configured in units of 6 resource blocks in the frequency. FIG. 2, split over FIGS. 2A and 2B, illustrates an example PDCCH mapping assuming 1 symbol CORESET, interleaved REG-to-CCE mapping and REG bundle size 2. A 6-RB (resource block) grid is shown. The numbers below the blocks indicate the CCEs being used, where each of 0, 1, 2, 3, 4, 5, 6, and 7 corresponds respectively to CCE #1, CCE #2, CCE #3, CCE #4, CCE #5, CCE #6, and CCE #7. Table 1 below lists the REG bundle sizes options in terms of REGs, supported by new radio (NR):

| CORESET length (#symbols) | Non-interleaved mapping (REG bundle: frequency × time) | Interleaved mapping (REG bundle: frequency × time) |
| --- | --- | --- |
| 1 | 6 (6 × 1) | 2 (2 × 1), 6 (6 × 1) |
| 2 | 6 (3 × 2) | 2 (1 × 2), 6 (3 × 2) |
| 3 | 6 (2 × 3) | 3 (1 × 3), 6 (2 × 3) |

There is a linkage between a search space set and a CORESET. In Rel-15, the max number of CORESETs configurable for a bandwidth part (BWP) in a cell for a UE is three and the max number of search space sets configurable for a BWP in a cell for a UE is 10, respectively.

II. Overview of Wideband Operation for NR-U

As previously stated, wideband operation is one of the building blocks for NR unlicensed. Both carrier aggregation and BWP (bandwidth part) mechanisms are supported in Rel-15 NR for wideband operations (on licensed spectrum) and NR unlicensed may use both mechanisms to achieve sufficiently versatile support for wideband.

Conventional carrier aggregation offers several benefits, such as the following:

1) Frequency domain flexibility: aggregated carriers do not need to be adjacent but may be widely apart. This offers, e.g., diversity for channel access.

2) Each carrier may employ its own LBT (listen before talk), meaning there is agile channel access.

Hence, carrier aggregation may be supported for NR unlicensed in addition to facilitating the LAA operation with NR licensed carrier. Of course, carrier aggregation has also its price: multiple RF chains are required, increasing the price of UE transceivers. Additionally, carrier aggregation increases UE power consumption and has rather considerable latency in the component carrier activation/deactivation (to save UE power).

In Rel-15 NR, a concept of serving cell adaptive BW was introduced by means of BWPs. In Rel-15 NR, a UE is instructed to operate on a specific part of a gNB's BW, that is, on a BWP. Up to four BWPs can be configured separately for UL and DL. Each BWP can have, e.g., the following, separately configured:

1) subcarrier spacing (SCS);
2) cyclic prefix;
3) BW in terms of contiguous PRBs as well as location of the BW in the cell's total BW; and/or
4) K0, K1 and K2 values defining the time offsets from DL assignment reception to the beginning of assigned PDSCH, from the end of assigned PDSCH to associated HARQ-ACK transmission time, and from UL grant reception to the start of PUSCH transmission, respectively.

In case of unpaired spectrum (i.e. TDD), UL and DL BWPs can be paired, in which case the center frequency of both BWPs is required to be the same. One of the BWPs may be defined as the default BWP.

In Rel-15 NR, a UE 110 may have only one BWP active at a time. The active BWP can be indicated by a field in the DCI or by RRC signaling. BWP switching occurs after UE has received the signaling changing the active BWP, but switching time is yet to be determined. The UE may also fall back to default BWP after a configured period of inactivity.

The BWP mechanism provides an alternative wideband mechanism when accessing unlicensed spectrum on adjacent 20 MHz channels, as this mechanism can provide savings in UE cost with reduced number of RF chains. A single RF chain and FFT processing can be used to access wide bandwidth of, e.g., 80 MHz or 160 MHz on 5 GHz or 6 GHz (potential) unlicensed bands. It is assumed herein that unlicensed band carrier size is, e.g., 80 MHz or 160 MHz (depending on the FFT size). Furthermore, if larger BW is needed, then there will be multiple carriers. This mechanism also improves the trade-off between UE throughput and battery consumption via fast dynamic BWP switching. As the BWP switching time is shorter than the component carrier (de)activation time (subject of current discussion in RAN4), the UE can be switched rather aggressively to narrow BWP (and back to wideband BWP), saving UE battery and compromising throughput less than the slower CC (de)activation. On the other hand, NR BWP switching time (about hundreds of microseconds) has clearly a different order of magnitude than a single clear channel assessment (CCA) (e.g., 9 microseconds) in an LBT procedure, where CCA is equivalent to a single measurement within an LBT procedure. This poses significant constraints on how BWP operation and LBT can interact.

Channel contention (i.e., LBT) mechanism is one of the components for efficient wideband operation, and the channel contention mechanism for wideband operations needs to be considered during the NR-Unlicensed study item (SI). It should be noted that both Wi-Fi and LTE LAA LBT operate on 20 MHz channels and some of the regulatory rules, e.g. ETSI's standard, require LBT operation on a 20 MHz grid at 5 GHz unlicensed bands. Hence, to meet regulatory requirements and to ensure fair coexistence with other systems, also NR unlicensed bands should support at least a 20 MHz grid for LBT operation. Of course, also wider LBT BWs should be supported for higher frequency unlicensed bands or for potential new unlicensed bands like the 6 GHz band.

III. Possible Issues with Conventional Techniques

For NR-unlicensed wideband (larger than 20 MHz) carrier we assume the following scenario, in an exemplary embodiment:

1) Operation on a 5 GHz unlicensed spectrum.
2) A large FFT size, such as 4 k FFT assumed for (licensed band) NR. The maximum number of PRBs per BWP in Rel-15 is 275. The assumption behind is that UE implementation is based on 4 k FFT (275 PRB*12 subcarriers/PRB=3300 subcarriers).
3) A large subcarrier spacing (SCS), such as 30 kHz or 60 kHz.

For the purpose of this document, we define the following terminology.

Carrier bandwidth is the NR carrier bandwidth, such as a carrier of 40 MHz (two subbands of 20 MHz each) for a subcarrier spacing of 15 kHz, a carrier of 80 MHz (four subbands of 20 MHz each) for a subcarrier spacing of 30 kHz, or a carrier of 160 MHz (eight subbands, from zero to seven, of 20 MHz each) for a subcarrier spacing of 60 kHz. See FIG. 3. As can be seen for this example that assumes a 4 k FFT, each carrier bandwidth comprises multiple 20 MHz subbands.

A subband is one (or possibly multiple adjacent) channel(s) on an unlicensed carrier, typically having a bandwidth of 20 MHz. A subband is aligned with the bandwidth of single LBT.

Figures 3, 4:
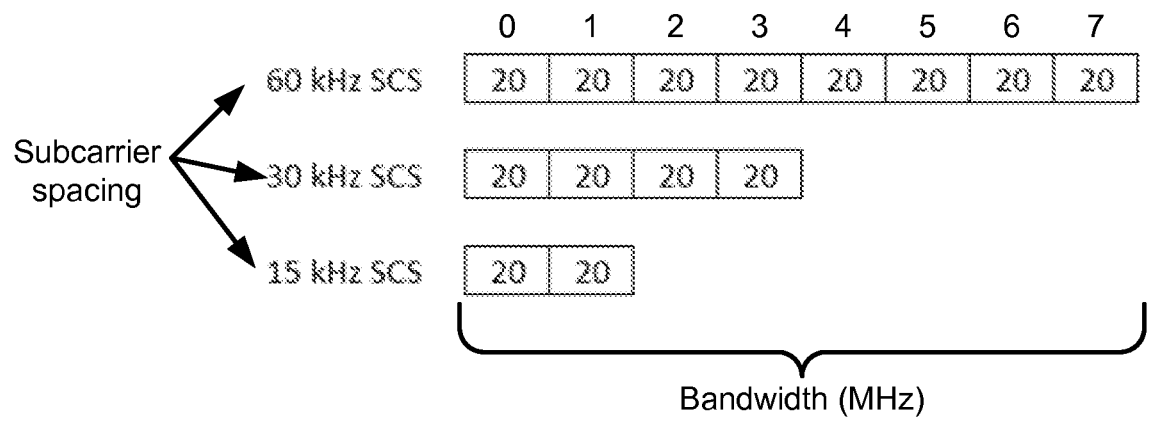
FIG. 3 illustrates possible NR BWs for a 4 k FFT and different subcarrier spacings, where "20" denotes a 20 MHz subband.
FIG. 4 illustrates possible combinations of contiguous transmission BW for a gNB, with carrier BW=80 MHz, and subband BW=20 MHz.

In an example, we consider a DL scenario. When operating according to NR-U scenario, a gNB 170 should perform LBT before the gNB 170 can start transmitting a DL NR-U Tx burst in the cell. To meet regulatory requirements and to ensure fair coexistence with other systems, also NR unlicensed should support subband LBT, e.g., with 20 MHz resolution. The practical implementation of subband LBT is beyond the scope of this invention report. However, FIG. 4 shows possible transmission bandwidth for NR-U transmission combinations for a gNB 170 after a subband-specific LBT. This example assumes 80 MHz carrier bandwidth, and contiguous allocation of 20 MHz subbands. The subbands are 0, 1, 2, and 3, and the figure shows how one, two, three, or all four subbands could be allocated for NR-U transmissions.

Due to the subband specific LBT, prior to transmitting on the subbands that are available, the gNB 170 may need to adjust the transmission bandwidth (Tx BW) configuration, including RF settings (e.g., center frequency, analog filters) in order to meet the regulatory rules defined for the out-of-band emissions. The gNB 170 may decide on and perform the transmission bandwidth adaptation during the LBT process, although the details of gNB BW adaptation are outside of the scope of this description. However, for the purpose of this document, we define transmission bandwidth (TX BW) as a specific term. With this, we mean the part of the spectrum on which gNB actually transmits after LBT. As said, the TX BW may be equal to the carrier BW or the TX BW is a portion of carrier BW (one or more subbands) based on the outcome of LBT. It should be understood that given the said meaning of TX BW, change in Tx BW (e.g., and its configuration) may change the bandwidth of transmission, the center frequency of transmission, or both the bandwidth and center frequency of transmission.

From a UE point of view, the situation is more challenging. This can be seen as a chicken-and-egg problem, as follows:

1) Prior to the start of DL transmission, the UE knows only the wide carrier BW (i.e., all subbands) on which the gNB may transmit but not the actual transmission band (Tx BW). So UE will use the widest possible BW to detect DL transmission burst.

2) The UE could read the Tx BW configuration from DL control channel.

3) On the other hand, the control channel transmission depends on the Tx BW configuration.

Hence, one exemplary problem is how to facilitate DL control channel monitoring when a UE 110 has uncertainty related to the gNB's Tx BW configuration. Consider the following questions. How can it be ensured that sufficient control channel capacity can be achieved also when the gNB Tx band is narrow? How can it be ensured that a UE's PDCCH blind decoding burden stays reasonable? How can it be ensured that there are sufficient numbers of BDs available for UE-specific DCIs? These are issues with these wideband NR-U scenarios currently having no clear answers.

Concerning other technologies, in an NR licensed band scenario, transmission bandwidth of the gNB is always known by the UE beforehand. In an LTE LAA scenario, this scenario supports WB operation only by means of carrier aggregation, where each carrier typically has its own, independent PDCCH. In a WiFi scenario, WiFi does not support scheduling structure based on PDCCH. Therefore, techniques used in these technologies do not transfer explicitly to wideband NR-U scenarios.

IV. Overview of Exemplary Embodiments

Exemplary embodiments herein solve or ameliorate the issues described above. Exemplary ideas relate to PDCCH monitoring in WB operation. Exemplary embodiments contain the following configuration aspects, depending on implementation:

1) Subband configuration: Bandwidth adaptation as well as LBT takes place with subband resolution, which is predefined/preconfigured. In a typical case, subband size is 20 MHz but the size can be also be different from that, e.g., a multiple of 20 MHz. Different subbands may be equally sized or they may have different sizes (e.g., [20 20 20 20] MHz, or [40 20 20] MHz).

2) BWP configuration: Each UE may be configured with a wideband BWP containing predefined subbands. The BWP configuration may contain all subbands corresponding to the gNB carrier BW, or a subset of those subbands (to facilitate, e.g., UE power saving).

For each (DL) COT, the gNB 170 determines the RF configuration, in terms of consecutive (i.e., adjacent in frequency domain) subbands. This may be performed based on subband specific LBT. The gNB 170 may adjust its Tx BW configuration accordingly. According to an exemplary proposed idea, the gNB 170 indicates its Tx BW configuration to the UEs in the cell (e.g., at least) by means of DL control information. The "at least" is used here because this does not exclude usage of other signals such as preamble and/or PDCCH demodulation reference signal (DMRS) and/or tracking reference signal (TRS). The indication may be conveyed via group common PDCCH (GC-PDCCH) and/or via dedicated DCI (such as DL/UL grant). Additionally, the Tx BW configuration may indicate the active subbands, e.g. in terms of bitmap or RIV (resource indication value). In addition to Tx BW configuration, the GC-PDCCH may indicate the slot format for one or more slots of the COT.

One important exemplary idea relates to the way the UE PDCCH monitoring and the corresponding CORESET(s) are arranged within the COT: (1) before knowing the gNB Tx BW configuration; and (2) after knowing the gNB Tx BW configuration.

In the following, we consider those aspects in more detail.

V. Additional Details: Exemplary Aspects

A number of exemplary aspects are described now.

V.1. Aspect 1

Figure 5:
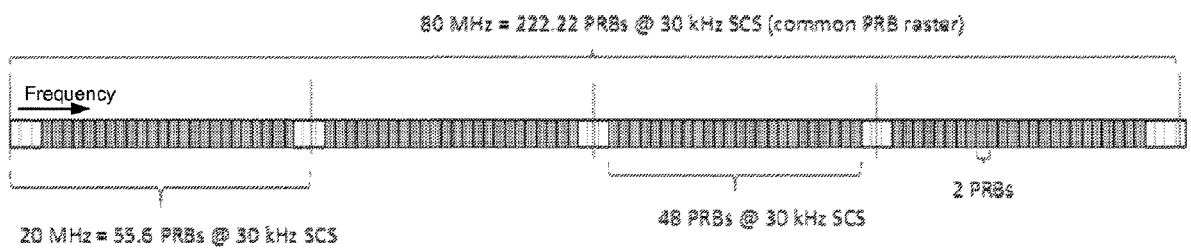
FIG. 5 illustrates CORESET spanning over frequency chunks, where subcarrier spacing is 30 kHz.

A first aspect concerns determining the gNB Tx BW configuration from PDCCH. To be precise, this gNB Tx BW configuration is the intersection of UE BWP configuration and gNB Tx BW configuration. This is achieved such that the PDCCH candidates are confined within each subband. Furthermore, the configuration is made such that each subband contains sufficient amount of PDCCH candidates to convey PDCCH reliably enough. An example of the wideband CORESET configuration placed on a common PRB grid and covering four subbands is shown in the example of FIG. 5. FIG. 5 illustrates CORESET spanning over four frequency chunks. Subcarrier spacing is 30 kHz in this example. As can be seen, an 80 MHz frequency band for a carrier is formed using 222.22 PRBs (=80 MHz/360 kHz) at 30 kHz SCS, which is a common PRB raster. A 20 MHz frequency band is formed using 55.6 PRBs at 30 kHz SCS, of which 48 PRBs are used, e.g., for subband-specific CORESET. The other PRBs may be unused (e.g., to serve as guard bands). FIG. 5 also illustrates a size of two PRBs ("2 PRBs").

In an exemplary embodiment, interleaving (if used) is performed within each subband but not between subbands (see also examples below). Additionally, the gNB 170 transmits (at least) one GC-PDCCH via (at least) one of the subbands, as indicated below:

1) In order to minimize the UE BD burden (and time spent for detection GC-PDCCH), the gNB may always send GC-PDCCH via a predefined subband, e.g., the lowest transmitted one;

2) In the later slot(s) belonging to the same COT, the UE 110 may search GC-PDCCH only from the subband where the first GC-PDCCH was found in that COT, as this will save BDs as well as PDCCH resources for dedicated DCIs and other slots of the COT; and/or 3) In order to support narrowband operation (e.g., with UEs able to receive only on a single 20 MHz subband), the gNB 170 may transmit separate GC-PDCCHs on multiple subbands.

V.2. Aspect 2

A second aspect concerns providing opportunities for additional control resources for the cases when only a limited number of subbands is active and included to the gNB's Tx BW. The motivation behind this is that one, e.g., GC-PDCCH, DL assignment, or UL grant DCI may require a considerable amount of control channel resources, e.g., up-to 8 CCEs, and this may consume the entire control channel capacity of a single subband. On the other hand, in cases when multiple subbands are available additional control channel capacity may not be needed. This is due to the fact that control channel capacity scales linearly with the channel bandwidth and a single GC-PDCCH may be shared between multiple subbands.

In this aspect, the additional control resources can be determined based on the DCI. Another option is to have the additional control resources present always when Tx BW configuration indicated by the gNB is just one or two subbands. Furthermore, the additional control resources may be available only for the first mini-slot or slot monitoring occasion of the COT, or in all mini-slots or slot monitoring occasions of the COT. The additional control resources may be available only on the subband carrying GC-PDCCH in the later slots of the COT.

V.3. Aspect 3

A third aspect involves the UE changing the PDCCH monitoring based on detected indication on the gNB Tx BW configuration. In this aspect, PDCCH monitoring corresponding to the first mini-slot or slot covers all the possible subbands. When the gNB's Tx BW configuration is known after the first mini-slot or slot, the UE 110 adapts the PDCCH monitoring configuration (including also CORESET configuration, if changed) according to the determined Tx BW configuration. As discussed, the gNB 170 may dynamically allocate additional control resources already for the 1st slot of the COT. The change of the PDCCH monitoring may impact also on the PDCCH monitoring between different DCIs (i.e., search space set configuration). For example, the first slot may have more BDs for the GC-PDCCH whereas other slots may have more BDs for dedicated DCIs.

VI. Additional Details: Examples of CORESET Variation

Figure 6:
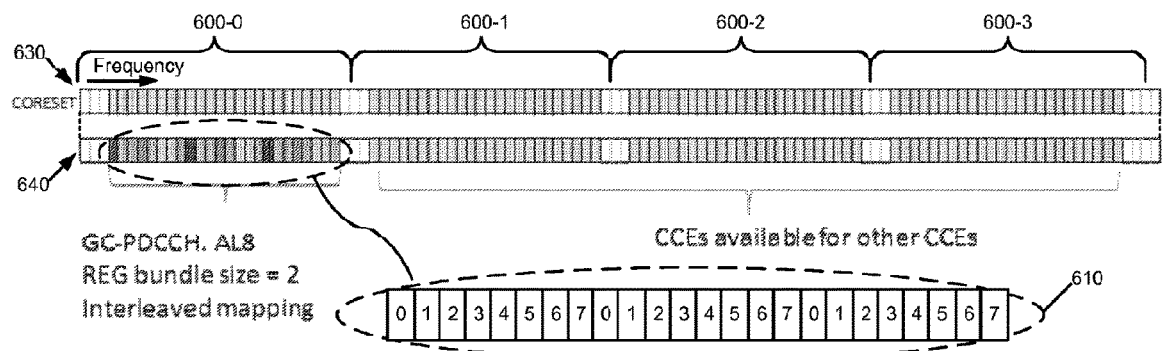
FIG. 6 illustrates a CORESET variation in response to LBT positive for all subbands.
Figure 7:
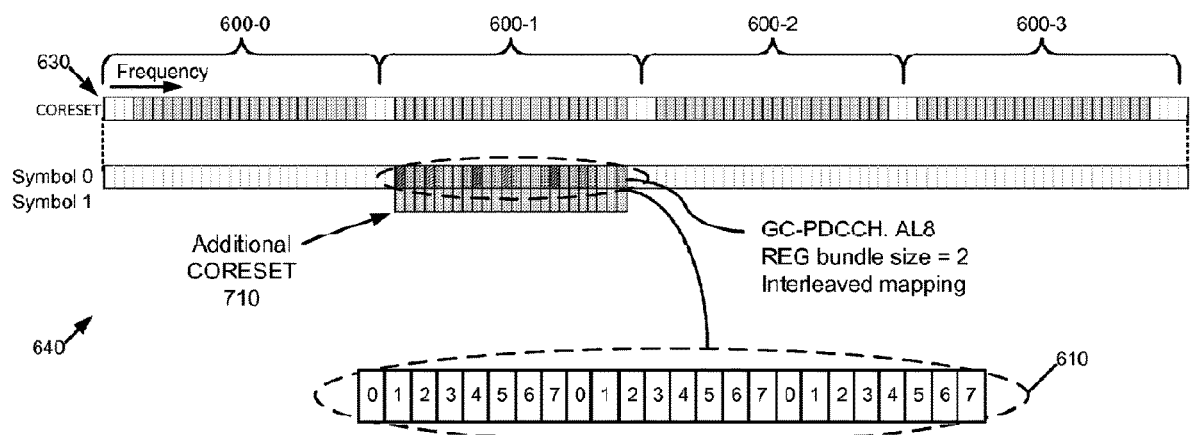
FIG. 7 illustrates a CORESET variation in response to LBT positive only for the second (2nd) subband.
Figure 8:
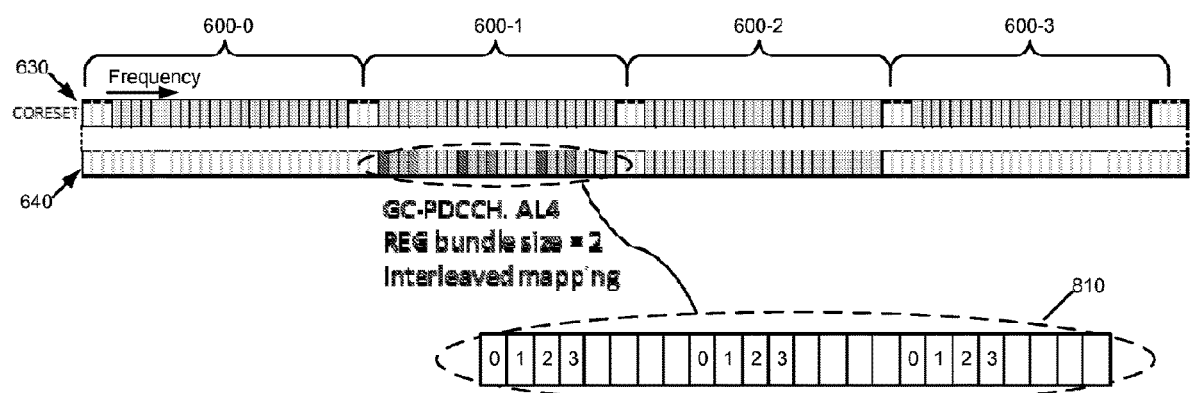
FIG. 8 illustrates a CORESET variation in response to LBT positive for the second (2nd) and the third (3rd) subband.

In the following, we provide three examples how the CORESET might be varied at the UE. In FIGS. 6-8, the first row 630 represents the CORESET monitoring based on the UE's BWP configuration, and the second row 640 represents the CORESETs based on the gNB's Tx BW configuration.

VI.1. Example 1

A first example concerns a case where an LBT procedure indicates for all subbands to be available for transmission, that is, they are unoccupied. This is illustrated in FIG. 6, which illustrates a CORESET variation in response to LBT positive (meaning an LBT procedure indicates the channel can be used) for all subbands, using the 80 MHz carrier of FIG. 5. This is the assumed configuration:

1) The initial CORESET consists of four subbands 600-0, 600-1, 600-2, and 600-3, with 48 REGs (8 CCEs) in each subband, and REG bundle size=2, where REG bundles are mapped in interleaved manner within each subband;
2) Tx BW configuration for a carrier covers four subbands 600-0 through 600-3;
3) GC-PDCCH is sent using the first subband and using aggregation level (AL) 8.
4) GC-PDCCH occupies all REGs of the CORESET in the first subband 600-0; and
Subbands 600-1, 600-2, 600-3 are available for conveying other PDCCHs.

FIG. 6 in reference 610 shows the CCEs that are mapped to the REG bundles, where numbers 0, 1, 2, 3, 4, 5, 6, and 7 indicate CCE #0, CCE #1, CCE #2, CCE #3, CCE #4, CCE #5, CCE #6, and CCE #7, respectively. Note that this is merely for ease of reference, and other mappings may be used. Furthermore, one box corresponds to two REGs, and each CCE contains three REG bundles.

VI.2. Example 2

This example concerns LBT positive only for the second (2nd) subband. See FIG. 7, which illustrates a CORESET variation in response to LBT positive only for the second subband 600-1, using the 80 MHz carrier of FIG. 5. In this example, the Tx BW configuration covers only the 2nd subband 600-1. An additional CORESET 710 is made available for another symbol (in this example, Symbol 1) of the (mini-)slot for conveying other PDCCHs. Another symbol, illustrated as Symbol 0, contains the GC-PDCCH, with aggregation level (AL) 8, REG size of two and interleaved mapping. Symbols 0 and 1 are the first two OFDM symbols of a DL burst. This figure uses the same CCEs to REG bundles mapping in reference 610 from FIG. 6.

VI.3. Example 3

In this example, LBT positive occurs for the second and third subband. See FIG. 8, which illustrates a CORESET variation in response to LBT positive for the second (2nd) and the third (3rd) subband, using the 80 MHz carrier of FIG. 5. The Tx BW configuration covers the 2nd and the 3rd subbands. The GC-PDCCH is sent using the 2nd subband and using aggregation level 4. There are 4 CCEs from the 2nd subband 600-1, and 8 CCEs from the 3rd subband 600-2 that are available for conveying other PDCCHs. FIG. 8 in reference 810 shows the CCEs that are mapped to the REG bundles, where numbers 0, 1, 2, and 5 indicate CCE #0, CCE #1, CCE #2, and CCE #5, respectively.

VI.4. Example for PDCCH Monitoring Burden

The following is an example for PDCCH monitoring burden. The following assumptions are made:
1) Assume four subbands;
2) Assume 8 CCEs for each subband;
3) Assume that for each subband, GC-PDCCH is monitored using 2 candidates with AL4, and 1 candidate with AL8, with three candidates per subband; and
4) Assume 4×3=12 BDs per wideband carrier.

It can be noted that this is a reasonable value (at least for the first slot of the COT). It has been agreed, for instance, that with 30 kHz SCS, the UE supports 36 BDs per slot. Hence, based on this example, there would be 24 BDs/slot available for other BD candidates.

VII. Additional Details: Possible Exemplary UE Operation

Figure 9:
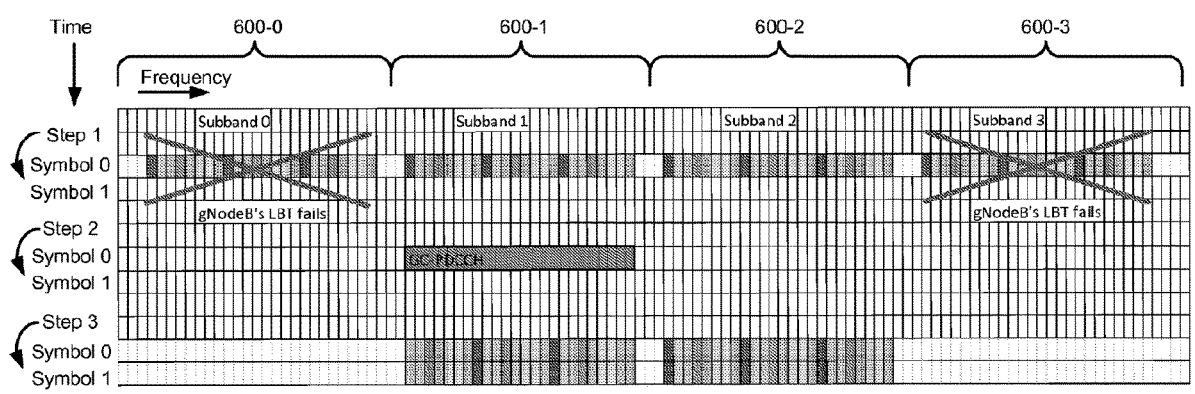
FIG. 9 illustrates UE operation in four subbands of NR-U bands according to an exemplary embodiment.

Possible exemplary UE operation is described in reference to FIGS. 9 and 10. FIG. 9 illustrates UE operation in four subbands 600-0, 600-1, 600-2, and 600-3 of NR-U WB bands according to an exemplary embodiment. FIG. 9 corresponds to FIG. 8, where the second and third subbands 600-1 and 600-2 are LBT positive, meaning that an LBT process indicates the gNB 170 can transmit in those subbands. The time axis is divided into Steps 1, 2, and 3, also described in FIG. 10, each of which has symbols 0 and 1, which are again the first two OFDM symbols of a DL burst. Note that all steps involve the same two symbols, i.e. the steps are following each other very rapidly in time.

FIG. 10 is split over FIGS. 10A and 10B, and is a logic flow diagram performed by a UE for wideband PDCCH for the unlicensed band and suitable for new radio, and illustrates the operation of an exemplary method or methods, a result of execution of computer program instructions embodied on a computer readable memory, functions performed by logic implemented in hardware, and/or interconnected means for performing functions in accordance with exemplary embodiments. The UE 110 is assumed to perform the blocks in FIG. 10, e.g., under control at least in part by the WB PDCCH module 140.

In block 1010, also referred to as Step 1, the UE 110 performs PDCCH monitoring according to a first CORESET and at least one first search space set configuration on, e.g., n subbands (n=4 in the example of FIG. 9). That is, the UE 110 assumes it has to monitor all four subbands 600-0 through 600-3 and initially proceeds based on that assumption. In more detail, for symbol 0, the initial assumption for the UE 110 and gNB 170 is that all subbands are used, and there are PDCCH CORESET portions on each of them. In Step 1 of FIG. 9, the available control resources for the gNB 170 are shown, and Step 2 (described below) shows an actual transmission. With regard to search space set configuration, search space covers only one aggregation level. Search space set covers multiple aggregation levels, and PDCCH monitoring is configured per search space set.

Blocks 1013 and 1015 are possible examples corresponding to block 1010, and individual ones or both of these may be used. As indicated in block 1013, the value of n may depend, e.g., on the UEs BWP configuration, and is equal to or less than the maximum number of subbands that the gNodeB can transmit on the unlicensed band carrier. Note that if UE supports also carrier aggregation, this can be seen as operation performed separately for each component carrier. As indicated in block 1015, the at least one first search space set configuration may define the PDCCH monitoring (at least) for group common control information such as GC-PDCCH. This may indicate, e.g., a number of BD candidates and/or aggregation levels for GC information (e.g., GC-PDCCH) on each subband. Alternatively or in addition, it may also indicate the monitoring occasions (at least) for GC information (e.g., GC-PDCCH). It should also be noted that GC control information may be GC-PDCCH, but also may be referred to using other terminology, such as group common downlink control information. It is possible for the subbands of the second control resource set to be next to each other, e.g., as shown in FIG. 9, where the subbands 600-1 and 600-2 are next to each other.

As can be seen in FIG. 9, there is no PDCCH transmission in subbands 600-0 and 600-3, as the channel is not available for use by the gNB 170 in these subbands. That is, the gNB 170 LBT fails (e.g., the channel is busy) and the gNodeB is not allowed to transmit using the unlicensed band in these two subbands. There are, however, available gNB NR-U WB transmissions in subbands 600-1 and 600-2, and these occur because LBT is positive, meaning the LBT succeeded and the gNB 170 can transmit on the unlicensed band. As indicated above, Step 1 shows the available control resources for the gNB, and Step 2 shows an actual transmission of GC-PDCCH.

In block 1017, it is determined by the UE whether one or more PDCCHs have been detected. If not (block 1017=No), the flow proceeds to block 1010. If so (block 1017=Yes), flow proceeds to block 1020. Note that PDCCH monitoring relates to predefined DCI formats with predefined RNTIs. Put differently, the UE detects control information intended to the UE on the PDCCH resources, and if there is such information, there is a detection of PDCCH in block 1017 (and similarly in block 1039, described below). Since there is a PDCCH transmission in subband 600-1 (see Step 1 in FIG. 9 and the transmission in symbol 0), the flow proceeds to block 1020.

In block 1020, also referred to as Step 2, based on the PDCCH monitoring and in response to at least one PDCCH being detected (e.g., CRC positive), the UE determines the gNodeB's Tx BW configuration. That is, the UE determines the subbands that the gNodeB uses for transmission during a given COT. However, because of LBT failures, some of the subbands 600 cannot be used. The eNB 170 indicates that to the UE 170 via GC-PDCCH, in this example in symbol 0 of Step 2, the first CORESET configuration being confined on the first symbol of the (mini-)slot. The gNodeB 170 takes also symbol #1 into use in Step 2 for PDCCH CORESETs (to compensate for the subbands 0 and 3 that cannot be used due to failed LBT in those subbands). The UE initially attempts to receive PDCCH from all subbands in symbol 0 and discovers GC-PDCCH in subband 600-1. The GC-PDCCH in symbol 0 of the second subband 600-1 tells the UE that there are also additional CORESETs that the UE should monitor within symbol #1 (see Step 3). The Tx BW configuration covers the second and the third subbands 600-1 and 600-2, respectively, in the example of FIG. 9. Blocks 1023 and 1025 are options corresponding to block 1020. As indicated by block 1023, the determination may be performed based on indication(s) carried on GC-PDCCH, which is illustrated in symbol 0 and subband 600-1 of Step 2 in FIG. 9. Alternatively and/or complementary, as indicated in block 1025, the determination may be carried on dedicated DCI (such as a DL grant). This approach may be used, e.g., for UEs configured to narrowband operation.

In block 1030, also referred to as step 3, after determining the gNodeB's Tx BW configuration, the UE continues PDCCH monitoring, using the determined gNodeB's Tx BW configuration, e.g., according to a second CORESET configuration and at least one second search space set on m subbands, m≤n. In this example, n=4 and m=2, but this is merely exemplary. This second CORESET configuration indicates in this example that symbol 1 in subbands 600-1 and 600-2 contains CORESET and should be monitored. That is, the UE may assume CORESET/search space set configuration according to Step 3 for all PDCCH at least until the end of the COT. In other words, Step 1, Step 2 are carried out only when there is uncertainty with respect to TX BW of the gNB 170.

It should be noted that Step 2 and Step 3 may alternatively be considered to be logical steps, which means that it is possible to run them also in parallel. Consider the following options. Option 1: Step 1 and Step 2 are carried out for a first monitoring occasion. Step 3 is carried out for a second monitoring occasion. Option 2: Step 3 is carried out already for the first monitoring occasion.

Blocks 1033, 1035, 1037, and 1038 are options corresponding to block 1030. As indicated in block 1033, the second CORESET may be a subset of the first CORESET, and is located on at least some of the active subbands (i.e., the m subbands) according to the gNodeB's Tx BW configuration. CCE indexing of the second CORESET may also depend on the gNodeB's Tx BW configuration.

As indicated in block 1035, the second CORESET may include also control resources on additional symbol(s) (when compared to the first CORESET). This may be determined based on GC-PDCCH received according to the first CORESET and at least one first search space set configuration. In block 1037, it is indicated that the second CORESET contains one or more portions in frequency (i.e., m subbands) and one or two portions in time (symbols occupied by the first CORESET+additional symbols if configured). In block 1038, it is indicated that the at least one second search space configuration contains PDCCH monitoring for at least one UE-specific DCI. The configuration may also contain a new search space set configuration for GC-PDCCH.

In block 1039, it is determined whether one or more PDCCHs have been detected. If not (block 1039=No), the flow proceeds to block 1030. If one or more PDCCHs have been detected (block 1039=Yes), the UE 110 determines in block 1040 whether control information is in the PDCCH and, if so, uses the control information to receive data from gNodeB's NR-U Tx BW or to transmit data to the gNB 170 (or both), using the NR-U Tx BW. It is noted that for an UL transmission from the UE 110 to the gNB 170, from the gNB point of view, this would be performed over NR-U Rx BW. On the other hand, as this is a TDD system, gNB's Tx BW and Rx BW are fully aligned. Therefore the NR-U Tx BW terminology is maintained here.

It should be noted that operation does not require that UE switches its BWP (including RF) to correspond to the (intersection of UE BWP and) gNB Tx BW. Instead, the UE 110 may keep its current BWP and corresponding RF BW. This is an important difference to Rel-15 BWP switching. One benefit of this is that there is no BWP switch transition time which may be in range of 600 μs-1 ms, i.e., in the order of few slots. As a possible downside, there can be increased impact from interference originating from other radio systems via inactive subbands.

VIII. Additional Details: Possible Exemplary gNB Operation

The related gNB/network operation is basically given by the direct counterpart to FIG. 10. Referring to FIG. 11, this figure is a logic flow diagram performed by a gNB for wideband PDCCH for the unlicensed band and suitable for new radio. FIG. 11 is split over FIGS. 11A and 11B. This figure illustrates the operation of an exemplary method or methods, a result of execution of computer program instructions embodied on a computer readable memory, functions performed by logic implemented in hardware, and/or interconnected means for performing functions in accordance with exemplary embodiments. The blocks in FIG. 11 are assumed to be performed by a base station such as gNB 170, e.g., under control of the WB PDCCH module 150 at least in part. The gNB 170 is assumed, though other base stations (such as an eNB) or network nodes may be used.

In block 1103, the gNB 170 configures the UE 110, e.g., with BWP configuration and the at least one first search space set configuration. In block 1105, the gNB 170 performs an LBT process on all (e.g., n) subbands to determine actual TX BW configuration for the unlicensed band carrier. This corresponds in part to Step 1 of FIG. 9. In block 1110, the gNB 170 transmits at least one PDCCH via CORESET/ search space set configuration defined according to actual TX BW configuration. The at least one PDCCH indicates to the UE the actual TX BW configuration for the unlicensed band carrier. This corresponds to Step 2 of FIG. 9. Blocks 1123 and 1125 are examples of possible implementations of block 1110. As block 1123 indicates, the indication(s) may be carried on GC-PDCCH. Alternatively or additionally, as per block 1125, the indication(s) may be carried on dedicated DCI (such as a DL grant).

In block 1130, transmits at least one PDCCH, using actual Tx BW configuration, according to a second CORESET and at least one second search space set configuration on m subbands defined by the actual Tx BW configuration. Block 1130 corresponds to Step 3 in FIG. 9. Blocks 1133, 1135, 1137, and 1138 are examples of possible implementations associated with block 1130. As indicated in block 1133, the second CORESET may be a subset of the first CORESET and is located on at least some of the active subbands according to the actual Tx BW configuration. CCE indexing of the second CORESET may also depend on the actual Tx BW configuration. Block 1135 indicates the second CORESET may include also control resources on additional symbol(s) (when compared to the 1st CORESET). This may be determined based on the transmitted GC-PDCCH according to the first CORESET and at least one first search space set configuration. Block 1137 indicates the second CORESET contains one or more portions in frequency (i.e. m subbands) and one or two portions in time (symbols occupied by the first CORESET+additional symbols if configured). As indicated by block 1138, the at least one second search space contains PDCCH monitoring for at least one UE-specific DCI. The configuration may also contain a new search space set configuration for GC-PDCCH.

The gNB 170 in block 1140, in response to control information being in PDCCH for this UE, uses the control information to transmit data on (or receive data using) gNodeB's NR-U Tx BW for this UE. Note that the gNB 170 would put the control information into the PDCCH in block 1130.

IX. Additional Details: Concluding Description

Without in any way limiting the scope, interpretation, or application of the claims appearing below, a technical effect and advantage of one or more of the example embodiments disclosed herein is a reasonable UE blind detection burden. Another technical effect and advantage of one or more of the example embodiments disclosed herein is more robust operation, e.g., compared to preamble-only based solutions (due to CRC protection). For instance, all UEs become aware of the gNB's Tx BW configuration already at the beginning of the COT. Another technical effect and advantage of one or more of the example embodiments disclosed herein is these solutions provide scalable control channel capacity for different scenarios with different amount of subbands obtained. Another technical effect and advantage of one or more of the example embodiments disclosed herein is the solutions can provide sufficient control channel capacity also in the scenarios where gNB's Tx BW convers only one or two subbands.

Embodiments herein may be implemented in software (executed by one or more processors), hardware (e.g., an application specific integrated circuit), or a combination of software and hardware. In an example embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 1. A computer-readable medium may comprise a computer-readable storage medium (e.g., memories 125, 155, 171 or other device) that may be any media or means that can contain, store, and/or transport the instructions for use by or in connection with an instruction execution system, apparatus, or device, such as a computer. A computer-readable storage medium does not comprise propagating signals.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

The following abbreviations that may be found in the specification and/or the drawing figures are defined as follows:

3GPP third generation partnership project
5G fifth generation
AL aggregation level
BD blind decoding (or blind detection)

BW bandwidth
BWP bandwidth part
CA carrier aggregation
CC component carrier
CCA clear channel assessment
CCE control channel element
CORESET control resource set
COT channel occupancy time
CRC cyclic redundancy check
CSS common search space
DCI downlink control information
DL downlink (from the network toward the UE)
DMRS demodulation reference signal
eMBB enhanced mobile broad band
eNB (or eNodeB) evolved Node B (e.g., an LTE base station)
ETSI European Telecommunications Standards Institute
FFT fast Fourier transform
GC-PDCCH group common PDCCH
gNB 170 or gNodeB NR base station (e.g., a base station for 5G)
I/F interface
LAA licensed assisted access
LBT listen before talk
LTE long term evolution
MME mobility management entity
NCE network control element
NR New Radio
NR-U NR unlicensed
N/W network
OFDM orthogonal frequency domain multiplexing
PDCCH Physical downlink control channel
PDSCH Physical downlink shared channel
PRB physical resource block
RB resource block
REG resource element group
Rel or Rel—release
RF radio frequency
RIV resource indication value
RNTI Radio Network Temporary Identifier
RRC Radio resource control
RRH remote radio head
Rx or RX receiver or reception
SCS subcarrier spacing
SGW serving gateway
SI study item
SS Search space
SSS Search space set
TDD time division duplex
TRS tracking reference signal
Tx or TX transmitter or transmission
UE user equipment (e.g., a wireless, typically mobile device)
UL Uplink (from UE toward the network)
WB wideband

What is claimed is:

1. A method, comprising:
performing at a user equipment first control channel monitoring according to a first control resource set and at least one first search space set configuration, the first control channel monitoring performed on n subbands, n>1, able to be transmitted by a base station in an unlicensed band carrier;
determining, in response to a detection of a control channel in the monitoring and from the control channel, transmission bandwidth configuration to be used by the base station in the unlicensed band carrier for control channels; and
performing by the user equipment second control channel monitoring according to a second control resource set and at least one second search space set configuration, the second control channel monitoring performed on m subbands, m≤n, in the unlicensed band carrier, the m subbands being a subset of the n of subbands.

2. The method of claim 1, wherein the first control resource set and at least one first search space set configuration contains at least one blind decoding candidate within each subband of the n subbands.

3. The method of claim 1, wherein a number of the n subbands depends on a bandwidth part configuration of the user equipment and is equal to or less than a maximum number of subbands that the base station can transmit on the unlicensed band carrier.

4. The method of claim 1, wherein the at least one first search space set configuration defines the control channel monitoring for group common control information, and at least one first search space set configuration indicates one or more of the following: a number of blind decoding candidates for the group common control information; aggregation levels for the group common control information on each of the n subbands; and monitoring occasions for the group common control information.

5. The method of claim 1, wherein the determining the bandwidth to be used by the base station is performed based on one or more indications carried in the control channel on a group common physical downlink control channel.

6. An apparatus, comprising at least one processor and at least one memory including computer instructions that, when executed by the at least one processor, cause the apparatus to:
perform at a user equipment first control channel monitoring according to a first control resource set and at least one first search space set configuration, the first control channel monitoring performed on n subbands, n>1, able to be transmitted by a base station in an unlicensed band carrier;
determine, in response to a detection of a control channel in the monitoring and from the control channel, transmission bandwidth configuration to be used by the base station in the unlicensed band carrier for control channels; and
perform by the user equipment second control channel monitoring according to a second control resource set and at least one second search space set configuration, the second control channel monitoring performed on m subbands, m≤n, in the unlicensed band carrier, the m subbands being a subset of the n of subbands.

7. The apparatus of claim 6, wherein the first control resource set and at least one first search space set configuration contains at least one blind decoding candidate within each subband of the n subbands.

8. The apparatus of claim 6, wherein a number of the n subbands depends on a bandwidth part configuration of the user equipment, and is equal to or less than a maximum number of subbands that the base station can transmit on the unlicensed band carrier.

9. The apparatus of claim 6, wherein the at least one first search space set configuration defines the control channel monitoring for group common control information, and at least one first search space set configuration indicates one or more of the following: a number of blind decoding candidates for the group common control information; aggregation levels for the group common control information on each of the n subbands; and monitoring occasions for the group common control information.

10. The apparatus of claim 6, wherein the determining the bandwidth to be used by the base station is performed based on one or more indications carried in the control channel on a group common physical downlink control channel.

11. The apparatus of claim 6, wherein the determining the bandwidth to be used by the base station is performed based on one or more indications carried in the control channel on dedicated downlink control information.

12. The apparatus of claim 6, wherein the second control resource set is a subset of the first control resource set and is located on at least some of a plurality of the m subbands according to the transmission bandwidth configuration.

13. The apparatus of claim 6, wherein subbands of the second control resource set are next to each other.

14. The apparatus of claim 6, wherein the second control resource set includes also control resources on one or more additional symbols when compared to the first control resource set.

15. The apparatus of claim 6, wherein the second control resource set comprises one or more portions in frequency as the m subbands and one or two portions in time, including symbols occupied by the first control resource set and additional symbols if configured.

16. The apparatus of claim 6, wherein at least one second search space set contains control channel monitoring for at least one user equipment-specific downlink control information.

17. The apparatus of claim 16, wherein the at least one second search space also contains a new search space set configuration for group common physical downlink control channel.

18. The apparatus of claim 6, wherein the computer instructions, when executed by the at least one processor, further cause the apparatus to:
determining whether configuration information is in a control channel for the second control channel monitoring and, if so, using the configuration information to receive data from a base station or transmit data toward a base station using the unlicensed band carrier.

19. The apparatus of claim 6, wherein the apparatus comprises a user equipment.

20. An apparatus, comprising at least one processor and at least one memory including computer instructions that, when executed by the at least one processor, cause the apparatus to:
transmit toward a user equipment at least one control channel and via a first control resource set and search space set configuration defined according to an actual transmission bandwidth configuration for an unlicensed band carrier for the apparatus, the at least one control channel indicating to the user equipment the actual transmission bandwidth configuration for the unlicensed band carrier; and
transmit a control channel using the actual transmission bandwidth configuration for the unlicensed band carrier, according to a second control resource set and at least one second search space set on one or more subbands defined by the actual transmission bandwidth configuration.

* * * * *